(12) United States Patent
Preuss

(10) Patent No.: US 7,478,043 B1
(45) Date of Patent: Jan. 13, 2009

(54) ESTIMATION OF SPEECH SPECTRAL PARAMETERS IN THE PRESENCE OF NOISE

(75) Inventor: Robert David Preuss, Sagamore Beach, MA (US)

(73) Assignees: Verizon Corporate Services Group, Inc., New York, NY (US); BBN Technologies Corp., Cambridge, MA (US)

( * ) Notice: Subject to any disclaimer, the term of this patent is extended or adjusted under 35 U.S.C. 154(b) by 915 days.

(21) Appl. No.: 10/454,962

(22) Filed: Jun. 5, 2003

Related U.S. Application Data

(60) Provisional application No. 60/455,748, filed on Mar. 19, 2003, provisional application No. 60/386,008, filed on Jun. 5, 2002.

(51) Int. Cl.
*G10L 15/20* (2006.01)
*G10L 15/00* (2006.01)

(52) U.S. Cl. .................................. 704/233; 704/231
(58) Field of Classification Search .............. None
See application file for complete search history.

(56) References Cited

U.S. PATENT DOCUMENTS 5,621,859 A * 4/1997 Schwartz et al. ............ 704/256
5,680,508 A * 10/1997 Liu ........................... 704/227
5,729,694 A * 3/1998 Holzrichter et al. ......... 705/17

OTHER PUBLICATIONS

D. Lalush, B. Tsui "The Importance of Preconditioners in Fast Poisson-based Iterative Reconstruction Algorithms for SPECT", Nuclear Science Symposium and Medical Imaging Conference, 1995.*
Preuss ("Testing Spectral Hypotheses in Noise", Third ASSP Workshop on Spectrum Estimation and Modeling, IEEE, 1986, pp. 125-128).*
Ku et al ("Design and Analysis of Toeplitz Preconditioners", IEEE Transaction on Signal Processing, vol. 40, No. 1, Jan. 1992).*
Robert D. Preuss: "Testing Spectral Hypotheses In Noise," 1986, pp. 125-128.
Gilbert Strang: "A Proposal for Toeplitz Matrix Calculations," *Studies in Applied Mathematics*, 1986, pp. 171-176.
Robert D. Preuss: "Autoregressive Spectral Estimation in Noise with Reference to Speech Analysis," 1991, pp. 66-88.

* cited by examiner

*Primary Examiner*—David R Hudspeth
*Assistant Examiner*—Samuel G Neway

(57) ABSTRACT

A speech analysis system includes a codebook (230) that stores speech spectral parameters corresponding to a speech spectral hypothesis. The speech spectral hypothesis may be combined with a noise spectral hypothesis and the combined hypothesis compared to a sensed signal via a discriminant function (240). The discriminant function may be evaluated using the preconditioned conjugate gradient (PCG) process.

42 Claims, 11 Drawing Sheets

230

| Index | Microphone Spec Params 1 ~301-1 | Microphone Spec Params 2 ~301-2 | Microphone Spec Params 3 ~301-3 | | Microphone Spec Params $N_1$ ~301-$N_1$ |
|---|---|---|---|---|---|
| 1 | | | | | |
| 2 | | | | | |
| 3 | | | | ... | |
| ... | | | | | |
| $N_1$ | | | | | |

Fig. 3A

| | | |
|---|---|---|
| 1 | Microphone Spec Params 1 | Probability $P_1$ |
| 2 | Microphone Spec Params 2 | Probability $P_2$ |
| 3 | Microphone Spec Params 3 | Probability $P_3$ |
| ... | ... | |
| N | Microphone Spec Params N | Probability $P_N$ |

ESTIMATION OF SPEECH SPECTRAL PARAMETERS IN THE PRESENCE OF NOISE

RELATED APPLICATIONS

This application claims priority under 35 U.S.C. § 119 based on U.S. Provisional Application No. 60/386,008, filed Jun. 5, 2002, and on U.S. Provisional Application No. 60/455,748, filed Mar. 19, 2003, the disclosures of which are incorporated herein by reference.

BACKGROUND OF THE INVENTION

A. Field of the Invention

The present invention relates generally to speech analysis systems, and more particularly, to the estimation of speech spectral envelope parameters for speech signals in the presence of noise.

B. Description of Related Art

Automated speech analysis has important applications in modern society. Such applications can include speech recognition systems, word spotting systems, speaker recognition systems, vocoders, speech enhancement systems, language recognition systems, and other systems which analyze human speech signals.

A key operation performed in many speech analysis systems is the estimation of parameters describing the speech spectral envelope. The spectral envelope can be thought of as an amplitude curve in the frequency-domain. The parameters describing the spectral envelope are typically estimated every 10-25 ms from (possibly overlapping) segments of a speech signal ranging from 15-30 ms in duration. Often, parameters correspond to an all-pole (i.e., autoregressive) representation of the spectral envelope. Such a representation can be related to an acoustic tube model of the human vocal tract.

Speech enhancement systems, for example, generally apply a time-varying linear filter to the input speech signal for the purpose of producing an enhanced output speech signal. Robust estimation of speech and noise spectrum parameters can help with the design of the time-varying linear filter. Some speech enhancement systems are used as a preprocessor to a vocoder or recognition system to improve the performance of the vocoder or recognition system. When the input speech signal includes acoustic noise, the time-varying linear filter may try to approximate a Weiner filter so that the output speech signal is relatively free of acoustic noise. Other speech enhancement systems may seek to compensate for deleterious effects of mechanical, electrical, or other systems that may have distorted the speech signal or they may seek to transform the input speech signal for some other purpose (e.g., to disguise the persons voice). In some systems, the estimated spectral envelope parameters are quantized to one of a finite number of possibilities. A vocoder is one such speech system that quantizes the spectral envelope parameters. In general, a vocoder analyzes a speech signal and transmits a quantized version of the spectral envelope parameters of the speech signal. The communication link over which the quantized version of the spectral envelope parameters are transmitted may be a low data rate communication link. A receiver synthesizes a speech signal for presentation to a human user based on the parameters.

Speech analysis systems tend to suffer degraded performance in harsh acoustic noise environments. In such environments, a noise signal (which may be due, e.g., to various types of machinery or natural phenomena) is sensed along with the speech signal. The noise-corrupted speech signal is thus presented to the speech analysis system. If the noise is sufficiently strong, the spectral envelope parameters may not closely match the true spectral envelope parameters of the speech signal absent the noise. In the case of a vocoder speech analysis system, this may mean that the synthesized human voice is no longer sufficiently intelligible to a human listener.

Speech recognition systems generally estimate spectral envelope parameters similar to those estimated in vocoder systems. In such speech recognition systems, the spectral envelope is typically represented by about 10-14 "cepstral" parameters. As with vocoder systems, when the signal presented to such systems is corrupted by sufficiently strong noise, these cepstral parameters will be sufficiently different so as to increase the word recognition error rate of the system.

A common theme among many conventional speech analysis systems, whether or not they are specifically designed to address the issues of noise corruption, is that they employ a two-step paradigm in which they estimate parameters and then quantize the parameters to obtain the final speech spectral envelope. Although the first step, estimation, may reduce the signal segment to a relatively small number of parameters, these parameters are effectively unquantized and, in principle, may represent any one of an infinite number of speech spectral envelopes. Nonetheless, the second, quantization step reduces this to one of a finite number of speech spectral envelopes. Results of two-step estimate-and-then-quantize techniques can degrade significantly in the presence of noise.

Thus, it would be desirable to more effectively obtain speech spectral envelopes, particularly as the signal-to-noise ratio (SNR) of the measured signal decreases.

SUMMARY OF THE INVENTION

Systems and methods consistent with the present invention estimate spectral parameters for a speech signal. The estimation is relatively robust in the presence of noise.

One aspect of the invention is directed to a speech analysis device including a codebook and a discriminant function calculation component. The codebook stores parameters corresponding to hypothesized speech power spectral density functions. The discriminant function calculation component evaluates a likelihood of each hypothesized speech power spectral density function corresponding to a speech signal segment based on application of the exact likelihood function evaluated using a preconditioned conjugate gradient (PCG) process.

A second aspect of the invention is directed to a method for determining spectral parameters corresponding to a segment of an audio signal. The method includes generating a hypothesized noise power spectral density function and generating a hypothesized speech power spectral density function. The method further includes combining the hypothesized power spectral density functions to obtain a spectral hypothesis and evaluating a likelihood that the spectral hypothesis corresponds to the segment of the audio signal based on application of the exact likelihood function evaluated using a preconditioned conjugate gradient (PCG) process.

Yet another aspect of the invention is directed to a speech analysis system that includes at least one sensor, a sampler that samples and quantizes signals from the sensors to form a sampled signal, and a spectral estimation component that estimates spectral parameters corresponding to speech of a talker. The spectral estimation component includes a codebook and a discriminant function calculation component that evaluates a likelihood of a hypothesized speech spectral envelope corresponding to the speech of the talker based on application of the exact likelihood function evaluated using the PCG process.

Another aspect of the invention is directed to a speech analysis device that includes a speech-codebook that stores speech spectral parameters corresponding to hypothesized speech spectral envelopes. A noise codebook stores noise spectral parameters corresponding to hypothesized noise spectral envelopes. A combiner combines the noise spectral parameters with the speech spectral parameters to obtain parameters corresponding to hypothesized signal spectral envelopes and a discriminant function calculation component evaluates a likelihood of each hypothesized signal spectral envelope corresponding to a spoken speech signal segment based on application of the exact likelihood function.

BRIEF DESCRIPTION OF THE DRAWINGS

The accompanying drawings, which are incorporated in and constitute a part of this specification, illustrate the invention and, together with the description, explain the invention. In the drawings.

FIG. 3A is a diagram illustrating an exemplary implementation of the codebook shown in FIG. 2;

FIG. 5 is a diagram illustrating a codebook that includes probability fields;

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim limitations.

Systems and methods consistent with the present invention estimate spectral envelope parameters for a speech signal by comparing discriminant functions calculated based on hypothesized speech power spectral density functions and the input speech signal. At least one of the discriminant functions may be based on the exact likelihood function, which is implemented using the preconditioned conjugate gradient (PCG) process as applied to Toeplitz (or block-Toeplitz) matrices.

System Overview

Figure 1:
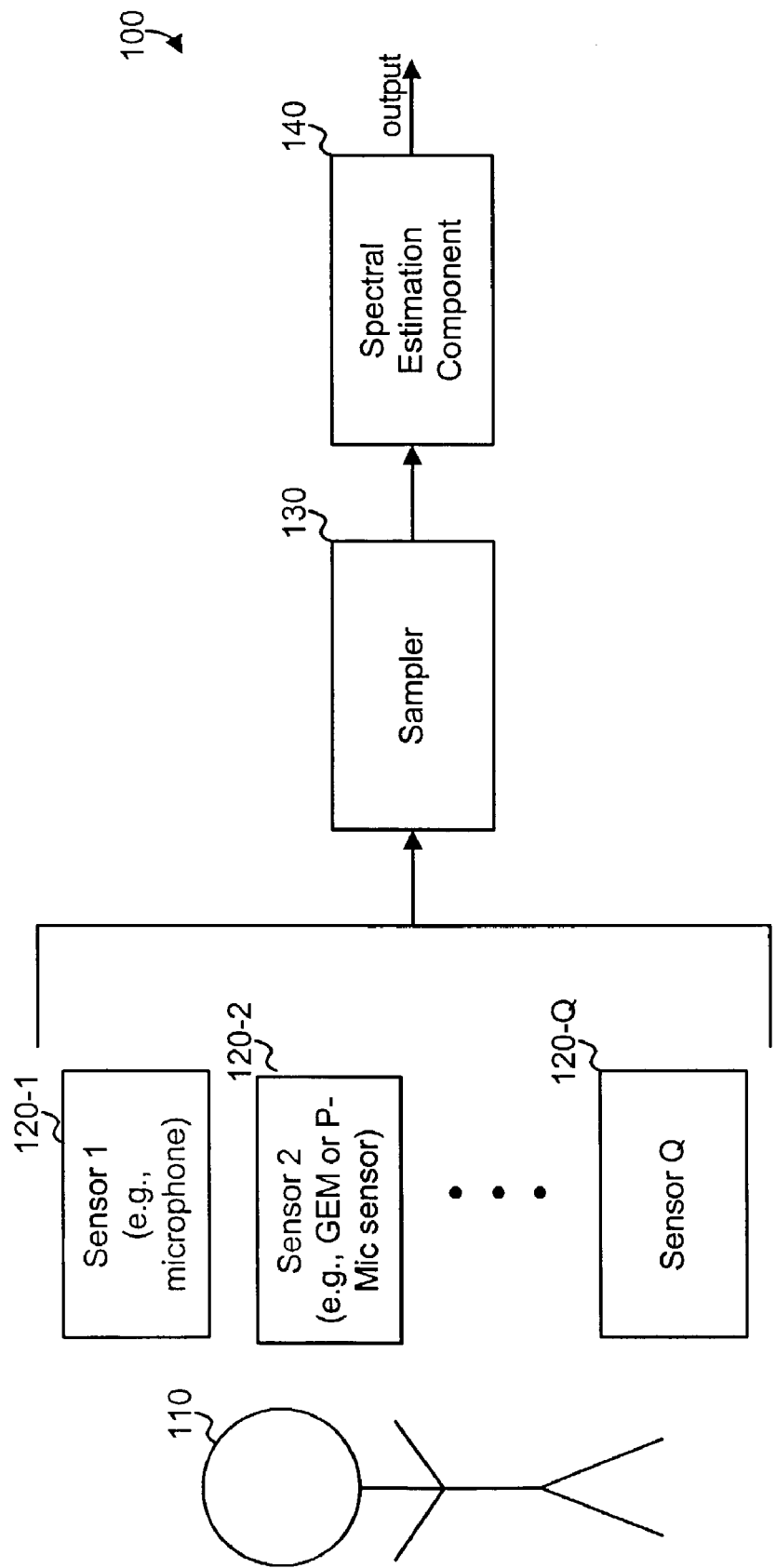
FIG. 1 is a high-level block diagram illustrating an exemplary system implementing concepts consistent with aspects of the present invention.

FIG. 1 is a high-level block diagram illustrating an exemplary system 100 implementing concepts consistent with aspects of the present invention. A speaker 110 (e.g., a live human speaker, a recorded human speaker, or synthesized human speech) may speak in the presence of one or more sensors 120-1 through 120-Q (collectively referred to as sensors 120). In one implementation, sensors 120 include microphones. In some implementations, sensors 120 may also include other types of sensors, such as general electromagnetic movement (GEM) sensors that detect the vibratory motion of the human tissue or physiological microphones (P-Mics) that can measure talker bone vibrations. These other types of sensors can generally be considered to be "non-acoustic sensors" that primarily measure vibrations of bone or flesh rather than acoustic pressure fluctuations. By comparison, microphones are designed to primarily measure acoustic pressure fluctuations and so can generally be considered to be "acoustic sensors". GEM sensors are known in the art and operate as sensitive phase-modulated quadrature motion detectors that determine the motion versus time of one or more moving objects in its field of vision. P-Mics are also known in the art and may include a small accelerometer positioned to measure vibration. Yet other types of sensors may additionally or alternatively be used in place of a GEM or P-Mic sensor.

The output of sensors 120 may be received by sampler 130. Sampler 130 may sample the signals from sensors 120 to convert the signals into sampled digital signal(s). Sampler 130 may, for example, sample the input signals at a frequency of 8 kHz. The sampled signal may be considered in discrete signal segments, $\alpha$, such as segments of 200 samples (25 ms when sampling at 8 kHz).

Based on the sampled signals, spectral estimation component 140 estimates spectral envelopes for sequential segments of the speech signal spoken by speaker 110. In general, spectral estimation component 140 estimates spectral envelopes based on a predetermined "codebook" of spectral parameters that describe spectral envelopes. Ideally, the codebook should contain an entry for each possible valid spectral envelope. For example, for human speech, the codebook may contain an entry corresponding to the possible basic sounds (of a predetermined length, such as 25 ms) that can be made by human talkers. The codebook stores the spectral parameters that correspond to these sounds.

In operation, spectral estimation component 140 may add a first power spectral density function from the codebook corresponding to a hypothesized speech signal power spectral density function to a second power spectral density function from the codebook corresponding to a hypothesized noise signal power spectral density function to obtain a final hypothesized power spectral density function. Spectral estimation component 140 may then compare the hypothesized power spectral density function to the sampled signal segment, $\alpha$, to obtain a value indicating the likelihood that the hypothesized power spectral density function corresponds to the sampled signal segment. This operation may be repeated for each value in the codebook to obtain the most likely hypothesized power spectral density function(s). Spectral estimation component 140 will be described in more detail below.

Mathematical Preliminaries

Assume that the sampled data from sensors 120 and output by sampler 130 is represented as a vector, $\alpha$, for each sequential signal segment. The signal segments may be, for example, 15-30 ms in duration. The vector α is assumed to be a realization of a random variable X, where X is a portion of a zero-mean stationary Gaussian process, that may have the probability density function $$p_x(\alpha) = \frac{1}{|2\pi R|^{1/2}} e^{-(1/2)\alpha^\dagger R^{-1}\alpha}, \quad (1)$$

which is completely determined by its covariance matrix $$R = E\{xx^\dagger\}. \quad (2)$$

In equation (2), E{ } denotes the expectation operator and $^\dagger$ is the transpose operation. Equation (1) is referred to herein as the "exact likelihood function" for vector α.

Because of equation (2), R is symmetric and positive definite. Because equation (1) refers to a stationary process, R is a Toeplitz matrix, which is a matrix that has constant entries along its diagonals. Consequently, the entry in the $n^{th}$ row and $m^{th}$ column of R, depends only on the difference n-m and is determined by a nonnegative, symmetric power spectral density function, h(θ), according to $$r_{n-m} = \int_{-\pi}^{\pi} h(\theta) e^{-i(n-m)\theta} \frac{d\theta}{2\pi}. \quad (3)$$

The log-likelihood function is defined as the logarithm of the probability density function evaluated at the given data vector and, as with the exact likelihood function itself, it is also a function of the unknown power spectral density, h. With α as the sampled data vector then, from equations (1) through (3), the log-likelihood function is the logarithm of equation (1), which is $$L(h) = -\frac{1}{2}\alpha^\dagger R^{-1}\alpha - \frac{1}{2}\ln|2\pi R|. \quad (4)$$

Thus, for a sampled vector α, equation (4) can be evaluated for a power spectral density function, h(θ), to determine the likelihood that the particular power spectral density function h(θ) corresponds to the particular sampled vector. Consistent with an aspect of the invention, the random variable X corresponding to the sampled vector α is assumed to be a portion of a process which is the sum of two additive, independent, zero-mean, stationary Gaussian processes. These two processes correspond to the power spectral density function of the "signal" process, g(θ), (i.e., the speech signal) and the power spectral density function of the "noise" process, μ(θ). Independence of the processes implies that h(θ)=g(θ)+μ(θ).

The above discussion of equations (1) through (4) assume that the sampled vector α includes sample data from a microphone. As previously mentioned, another sensor, such as a GEM or P-Mic sensor 120-2, may be used in addition to a microphone 120-1. When sensor 120-2 is used, sample vector α is constructed to include sample-data from all of sensors 120-1 and 120-2. Additionally, the symmetric positive-definite (SPD) Toeplitz matrix, R, now has a block-Toeplitz structure with a block size equal to the number of sensors and a Toeplitz order equal to the number of data samples per sensor in the analysis frame. In this case, R is completely determined by its first block-row. Also, when multiple sensors are used, g(θ) and μ(θ) become matrix functions of frequency. Thus, in terms of equation (3), r is a matrix with a number of dimensions equal to the number of sensors. On the right side of the equality symbol in equation (3), h is a Hermitian matrix function of the frequency variable with a number of dimensions equal to the number of sensors.

Spectral Estimation Component

Figure 2:
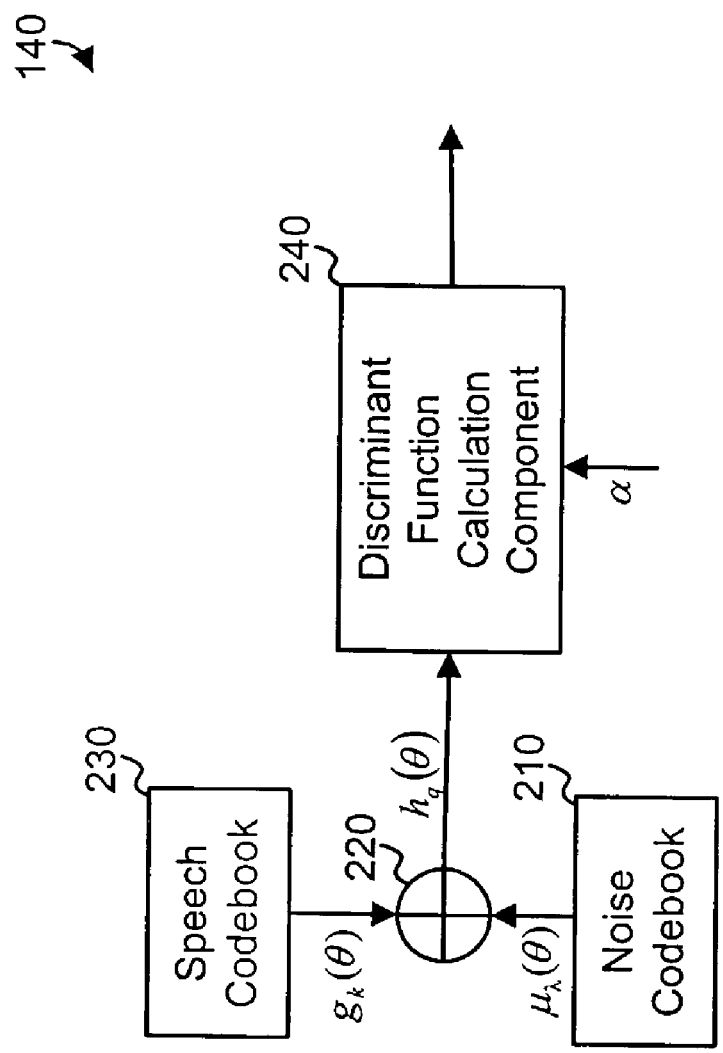
FIG. 2 is a block diagram illustrating exemplary operational components of the spectral estimation component shown in FIG. 1.

FIG. 2 is a block diagram illustrating exemplary operational components of spectral estimation component 140. As shown, spectral estimation component 140 includes noise codebook 210, combiner 220, speech codebook 230, and discriminant function calculation component 240.

Speech codebook 230 includes a number, $N_1$, of entries corresponding to speech power spectral density functions. The entries may be parameters that describe the speech power spectral density functions. Similarly, noise codebook 210 includes a number, $N_2$, of entries corresponding to noise power spectral density functions. As previously mentioned, the speech power spectral density function may be represented by g(θ), where the $N_1$ possible speech power spectral density functions include $g_k(\theta)$, for k=1, 2, ..., $N_1$. Similarly, the $N_2$ possible noise power spectral density functions may include $\mu_l(\theta)$, for l=1, 2, ... $N_2$. For each of these power spectral density functions, θ∈[-π,π) denotes the frequency variable wherein θ=0 corresponds to 0 Hz and θ=π corresponds to the Nyquist frequency, $F_s/2$=4 kHz for an $F_s$=8 kHz signal sampling.

As previously mentioned, statistical independence of the speech and noise processes implies that g(θ) and μ(θ) can be added together to obtain a hypothesized power spectral density function (also called a spectral hypothesis), h(θ). Accordingly, combiner 220 may add $g_k(\theta)$ and $\mu_l(\theta)$ to obtain $h_q(\theta)$, where q=(k-1)$N_2$+l. The total number of possible spectral hypotheses is N=$N_1 N_2$.

FIG. 3A is a diagram illustrating an exemplary implementation of codebook 230 in which a single microphone sensor 120-1 is used. Codebook 230 may include a number of entries 301-1 through 301-$N_1$, each of which define a possible power spectral density function, $g_k(\theta)$, of the speech signal process. Entries 301 may be predetermined by measuring, by microphone 120-1, speech patterns of speakers under ideal (i.e., low noise) conditions. In one implementation, entries 301 define the set of possible power spectral densities that may be made by a human speaker. Entries 301 may be associated with or addressed by index values 1 through $N_1$.

Figure 3B:
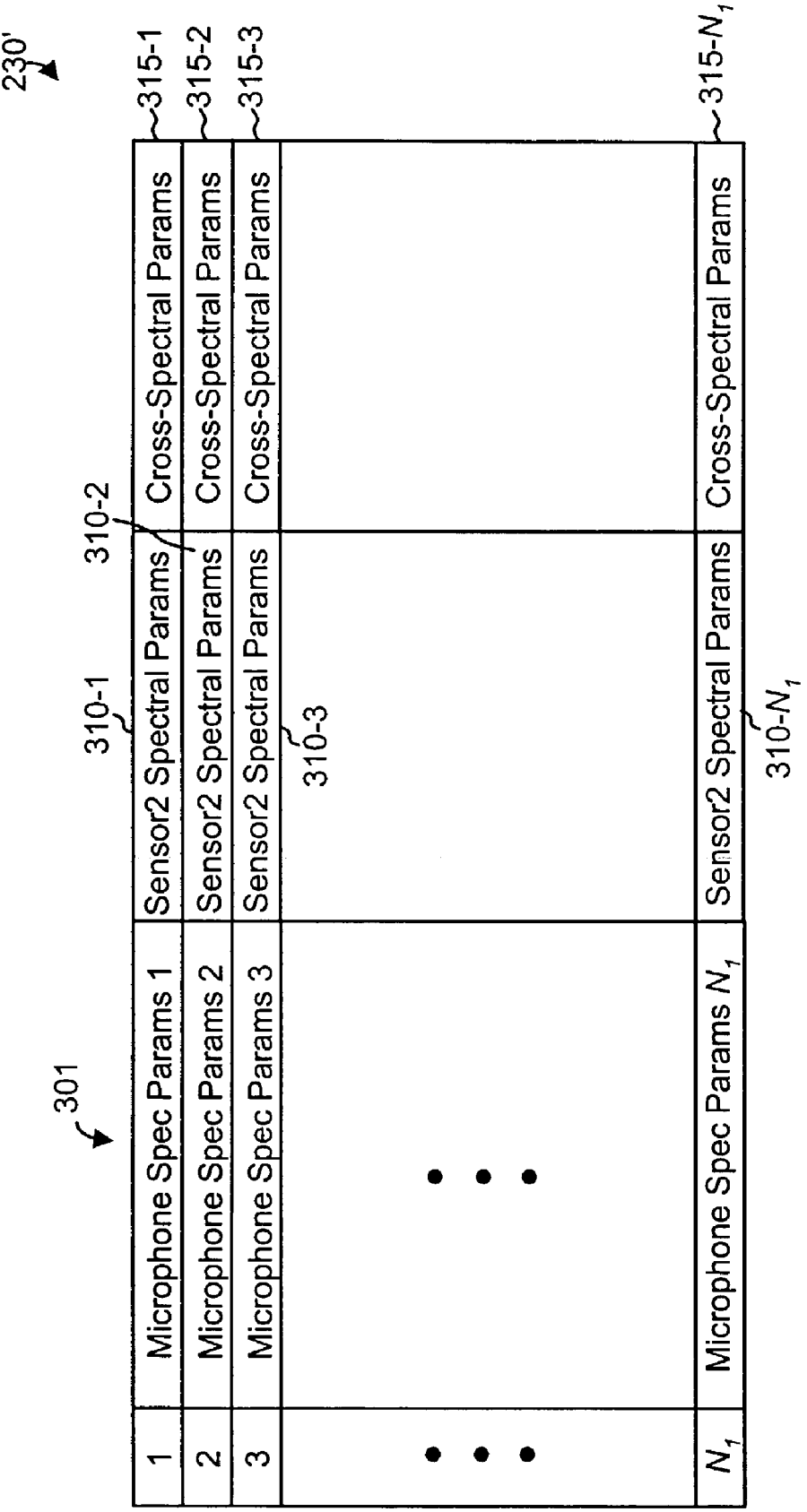
FIG. 3B is a diagram illustrating an exemplary alternate implementation of the codebook shown in FIG. 2.

In implementations in which an additional sensor 120-2 is used in addition to microphone 120-1, each entry in codebook 230 may contain, in addition to the parameters corresponding to the spectral response measured by microphone 120-1, additional parameters corresponding to the spectral response from sensor 120-2 and the cross-spectral response between the microphone and the sensor 120-2. FIG. 3B is a diagram illustrating an exemplary implementation of codebook 230, labeled as codebook 230', in which a sensor 120-2 is used in addition to microphone 120-1. In this implementation, codebook 230' again contains entries 301-1 though 301-$N_1$, each of which define a possible power spectral density of the speech process, as measured by microphone 120-1 under low noise conditions. Additionally, codebook 230' includes entries 310-1 through 310-$N_1$, which define the corresponding power spectral density as measured by sensor 120-2. Entries 315-1 through 315-$N_1$ may define a cross-spectrum power spectral density that is measured between sensor 120-1 and 120-2. Thus, in codebook 230', each set of entries, such as 301-1, 310-1, and 315-1, specify (as a function of frequency), a Hermitian spectral matrix for the speech under noise-free conditions. This Hermitian spectral matrix model may be output to combiner 220 as a power spectral density function, $g(\theta)$, in a manner similar to the power spectral density output when only a microphone 120-1 is used.

The entries in noise codebook 210 define possible power spectral densities of noise in the presence of speaker 110 that may be sensed by sensors 120. Noise codebook 210 may, for example, be measured ahead of time in an ideal environment based on various noise sources that are expected to be present during operation of system 100 (e.g., the whine or 'wop-wop' of a helicopter rotor if system 100 is to be deployed in a helicopter). In other implementations, entries in noise codebook 210 may be dynamically determined during operation of the system. For example, segments during "silence" portions (i.e., portions in which no speaker is speaking) of the input signal may be measured and added to noise codebook 210.

Discriminant function calculation component 140 determines if the spectral hypothesis, $h_q(\theta)$, from combiner 220 is an optimum spectral hypothesis for the current signal segment α. In one implementation, discriminant function calculation component 140 may evaluate a discriminant function for each of the q=1, 2, . . . , N possible spectral hypotheses to determine the optimal hypothesis. In other implementations, only a portion of the N possible spectral hypotheses may be evaluated. In this case, the portion that is evaluated may be intelligently selected. For example, the spectral hypothesis may be categorized using a tree structure. Discriminant calculation component 140 may work its way towards the leaves of the tree structure to obtain an optimal hypothesis.

The "optimum" spectral hypothesis may be determined by finding the index q that minimizes the statistical 'cost' or 'risk' of the spectral hypothesis corresponding to the sampled signal segment α. The statistical decision theory behind this optimization will now be explained in more detail.

As mentioned above, the observed signal segment α may be a vector of 200 values, where each value is a sample of the noise-corrupted speech signal. Thus, in principle, in the case of a single sensor 120-1, α may lie anywhere in the 200-dimensional space $R^{200}$. When there are multiple, Q, sensors, there may be 200Q samples in the vector which may lie anywhere in a 200Q-dimensional space.

Suppose $R^{200}$ is tessellated into N disjoint regions, $\Omega_p$, such that the union of these regions is the entire space, $R^{200}$. In this case, any particular observation, α, will lie in exactly one (and only one) of these N regions. The statistical decision rule may be that the hypothesis $h_p(\theta)$ best describes the observation, α, if (and only if) $\alpha \in \Omega_p$. That is, discriminant function calculation component 140 decides in favor of the p-th hypothesis iff (if and only if) α lies in the p-th decision region $\Omega_p$.

Because of this decision rule, the probability of deciding in favor of the p-th hypothesis when the q-th hypothesis is true is given by $$P(h_p | h_q) = \int_{\Omega_p} p_x(\alpha | h_q) d\alpha \qquad (5)$$

where $p_x(\alpha|h_q)$ is the probability density function, such as that defined in equation (1), of the observation vector, α, when the q-th hypothesis is true. Furthermore, if $\overline{P}(h_q)$ is the a priori probability that the q-th hypothesis is true, then $\Sigma_q P(h_p|h_q)\overline{P}(h_q)$ is the a priori probability of deciding in favor of the p-th hypothesis.

Assume that $C_{p,q}$ represents a 'cost' associated with deciding in favor of the p-th hypothesis when the q-th hypothesis is true. One implementation of a cost function assigns a cost which is zero when p=q and positive when p≠q; that is $$C_{p,q} = \begin{cases} 0 & \text{if } p = q \\ > 0 & \text{otherwise.} \end{cases} \qquad (6)$$

Then the Bayes's Risk $$B = \sum_{p,q=1}^{N} C_{p,q} P(h_p | h_q) \overline{P}(h_q) \qquad (7)$$

is the overall expected value of this cost. The optimum hypothesis test is defined as a tesselation of $R^{200}$ into N disjoint regions $\Omega_p$ for p=1, 2, . . . , N such that this Baye's Risk is minimized.

Combining equations (5) and (7) obtains $$B = \sum_{p=1}^{N} \int_{\Omega_p} F_p(\alpha) d\alpha \qquad (8)$$

where $$F_p(\alpha) = \sum_{q=1}^{N} C_{p,q} p_x(\alpha | h_q) \overline{P}(h_q). \qquad (9)$$

Moreover, from equation (8) it can be seen that the Baye's risk is minimized by choosing the tesselation $$\Omega_p = \{\alpha | F_p(\alpha) < F_q(\alpha) \forall q \neq p\}. \qquad (10)$$

In equation 10, the ∀ symbol means "for all." That is, the optimum hypothesis test is associated with the tesselation of $R^{200}$ into N disjoint regions $\Omega_p$ such that any vector α is in $\Omega_p$ only if $F_p(\alpha) < F_q(\alpha)$ for all q≠p.

For this optimum hypothesis test, the statistical decision rule can be restated as follows: Decide in favor of the p-th hypothesis if $F_p(\alpha) < F_q(\alpha)$ for all q≠p. Thus, for a given segment, α, discriminant function calculation component 140 may perform an optimum test procedure by computing the N values $F_p(\alpha)$ for p=1, 2, . . . , N and selecting the index p corresponding to the smallest one of these N values.

In alternate implementations, the statistical decision theory used by discriminant function calculation component 140 can be computationally simplified by assuming that the cost function is equal to $$C_{p,q} = \begin{cases} 0 & \text{if } p = q \\ 1 & \text{otherwise.} \end{cases} \qquad (11)$$

This implementation of the cost function may be referred to as the percent error cost function because, with this cost function, the Bayes' Risk can be understood as the overall expected probability of error and 100×B is the expected percent error.

With the percent error cost function, an optimum test procedure (applied to a given signal segment, $\alpha$) is to compute the N values $$G_q(\alpha) = p_x(\alpha|h_q)\overline{P}(h_q) \quad (12)$$

for q=1, 2, ... N and to choose an index q corresponding to a largest one of these N values. This procedure based on the percent error cost function is simpler than the more general procedure in which $F_p(\alpha)$ is computed since it avoids a computationally expensive multiplication by the cost matrix, $C_{p,q}$ (see equation 9). In some situations it may be simpler still to compute the N values $$\hat{G}_q(\alpha) = \ln G_q(\alpha) = \ln p_x(\alpha|h_q) + \ln \overline{P}(h_q) \quad (13)$$

for q=1, 2, ..., N and to choose an index q corresponding to a largest one of these N values. In equation (11), $\ln p_x(\alpha|h_q)$ is the log-likelihood function, $L(h_q)$, given by equation (4). This is an equivalent optimum test procedure to that of equation (12).

The above discussion relating to the optimum statistical decision was described with reference to a 200 sample signal segment. One of ordinary skill in the art will recognize that the discussion applies to a signal segment of any length M, in which M>0. In this case, the covariance matrix, R, is an M×M SPD Toeplitz matrix and the space $R^M$ is tessellated. Similarly, one of ordinary skill in the art will recognize that when multiple, Q, sensors are involved the space $R^{MQ}$ is tessellated.

Also, one of ordinary skill in the art will recognize that different "optimum" test procedures corresponding to different cost functions can be defined. For example, another possible cost function is the Kullback-Leibler information rate (also known as the Relative Entropy Rate) given by $$C_{p,q} = \lim_{M \to \infty} \frac{1}{M} \int p_x(\alpha|h_q) \ln \frac{p_x(\alpha|h_q)}{p_x(\alpha|h_p)} d\alpha \quad (14)$$

where the integral extends over the entire space $R^M$ or $R^{MQ}$.

As previously mentioned, in systems with multiple sensors 120, the data vector includes sample-data from all of sensors 120 and the SPD covariance matrix, R, has a block-Toeplitz structure (with a block size equal to the number of sensors 120 and a Toeplitz order equal to the number of data samples per signal segment). In this case, R is completely determined by its first block-row and the exact likelihood function can be determined using the PCG process as in the case with only a single sensor.

More particularly, when using multiple sensors 120, suppose that there are Q sensors. The observation vector $\alpha$ may be composed of MQ numbers corresponding to M sample times and each time-sample yielding Q numbers (one from each sensor output signal). In this case, the probability model given by equation (1) has the same form except that the covariance matrix, R, is now an MQ×MQ SPD matrix with a block-Toeplitz structure (of Toeplitz order M) determined by the Q×Q blocks $r_{n-m}$. These blocks are given in terms of the Hermitian Q×Q joint power spectral density matrix of the signals, $h(\theta)$, by equation (3).

Figure 4:
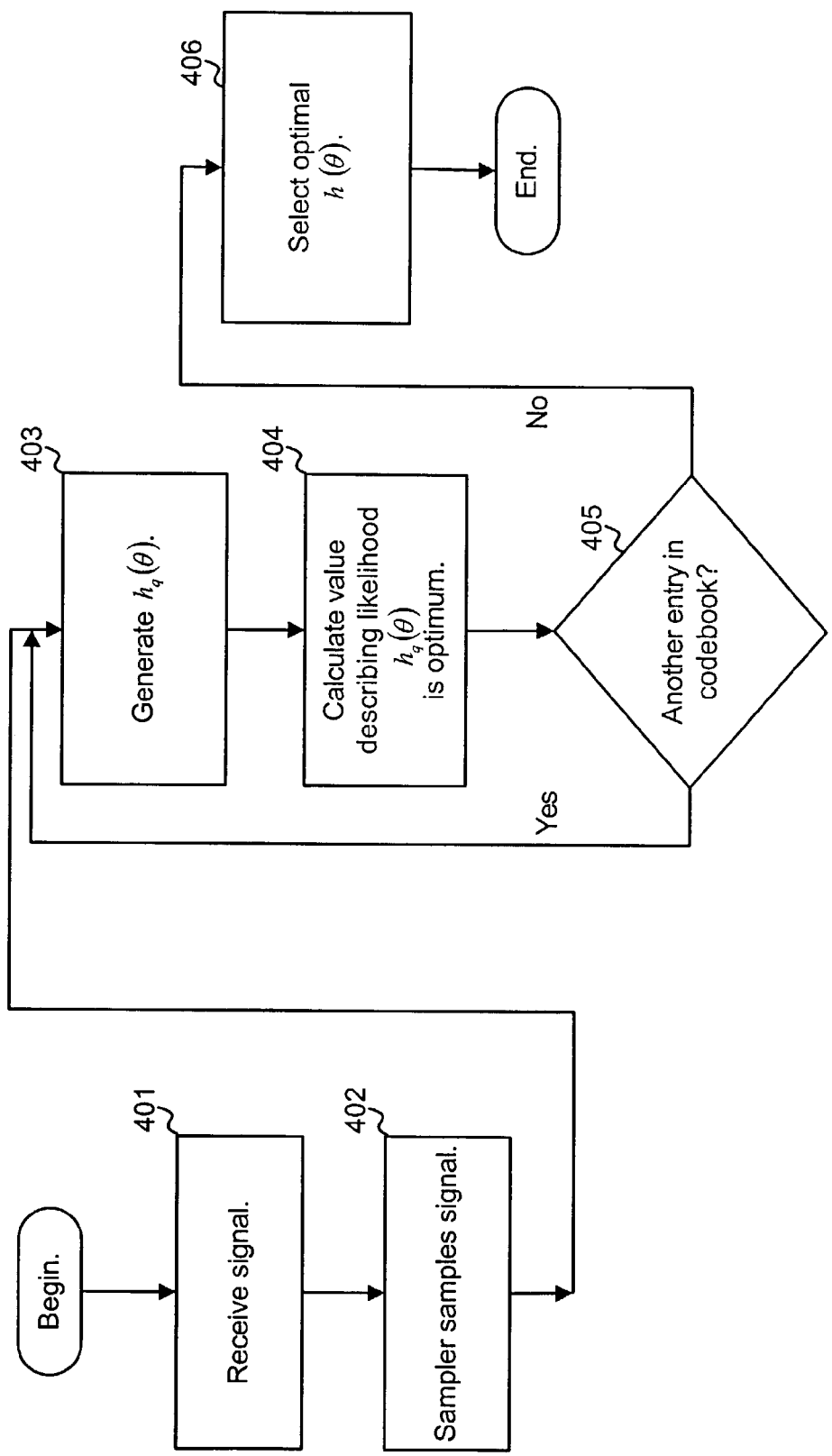
FIG. 4 is a flow chart illustrating exemplary operation of the system shown in FIG. 1 in estimating spectral parameters consistent with aspects of the invention.

FIG. 4 is a flow chart illustrating exemplary operation of system 100 in estimating spectral parameters consistent with aspects of the invention. System 100 may receive a constant stream of signal information from sensors 120 (Act 401). The received signals are sampled by sampler 130 and provided to spectral estimation component 140 (Act 402). The signals may be sampled at a frequency, such as 8 kHz, and transmitted as discrete segments of data, such as segments ranging from 15-30 ms in duration (e.g., 25 ms segments). Each sampled segment may be considered to be the sampled signal vector $\alpha$.

A spectral hypothesis, $h_q(\theta)$, is generated based on an entry from codebooks 210 and 230 (Act 403). As described above, the codebook entries may include parameters that describe a signal power spectral density function $g_k(\theta)$ and a noise power spectral density function $\mu_l(\theta)$. These power spectral density functions may be combined to produce $h_q(\theta)$.

Discriminant function calculation component 240 may then calculate, based on the sampled signal vector $\alpha$ and $h_q(\theta)$, a value describing the likelihood that $h_q(\theta)$ is the optimum $h_q(\theta)$ for the particular sampled signal vector $\alpha$ (Act 404). This value may be calculated based on equations (9), (12), or (13). The evaluation of each of these equations is based on the preconditioned conjugate gradient (PCG) process as applied to Toeplitz (or block-Toeplitz) matrices. In particular, discriminate function calculation component 240 may generate the symmetric positive-definite (SPD) Toeplitz (or block-Toeplitz) covariance matrix, R, and then use the PCG process to calculate the exact likelihood or log-likelihood value from equation (1) or (4) using R and the sampled signal $\alpha$. The exact likelihood or log-likelihood calculations may then be applied to equations (9), (12), or (13) to generate an indication whether $h_q(\theta)$ is optimum.

Consistent with an aspect of the invention, the exact likelihood function (or other similar discriminant function), as implemented by component 240 is evaluated through application of the preconditioned conjugate gradient (PCG) process as applied to the Toeplitz (or, in the case of multiple sensors, block-Toeplitz) type matrices R. The application of the PCG process provides for a computationally efficient and feasible technique for evaluating the exact likelihood function. More particularly, a potentially computationally challenging step is the evaluation of the first term in equation (4)

$$\left(i.e., \frac{1}{2}\alpha^\dagger R^{-1}\alpha\right)$$

by solving a symmetric positive-definite (SPD) Toeplitz (or block-Toeplitz) linear system of equations of order M (where M is equal to the number of samples in the sampled segment of audio). The PCG process is an iterative method for solving such systems that is numerically robust and computationally fast.

Acts 403-404 may be repeated for each entry in codebook 230 (Act 405). The optimum spectral hypothesis may then be selected (Act 406). Once an optimum spectral hypothesis with a corresponding index, p, has been selected, discriminant function calculation component 240 can uniquely determine the indices $k \in [1:N_1]$ and $l \in [1:N_2]$ such that $p=(k-1)N_2+l$. These indices may be output from spectral estimation component 140 and indicate the speech spectral hypothesis $g_k(\theta)$ and the noise spectral hypothesis $\mu_l(\theta)$ such that $h_p(\theta) = g_k(\theta) + \mu_l(\theta)$.

The above discussion has illustrated a model in which speech and noise processes are assumed to be additive and statistically independent of each other so that each spectral hypothesis $h_q(\theta)$ for the observed signal is the simple sum of a speech spectral hypothesis $g_k(\theta)$ and a noise spectral hypothesis $\mu_l(\theta)$. In other implementations, this assumption may be discarded and a single codebook of the N spectral hypotheses, $h_q(\theta)$, may be used.

Additionally, the above discussion assumed the use of the exact likelihood function evaluated through the PCG process. In some implementations, approximations to or variations on the exact likelihood function may instead be used and solved with the PCG process.

Context-Conditioned Estimates of Prior Probabilities

As described above, the exact likelihood function may be used as an optimal discriminant function to determine a correct hypothesis (i.e., speech spectral parameter set) from codebook 230. Consistent with an aspect of the invention, context-conditioned estimates of the prior probabilities of the correct spectral parameter sets may be used to enhance the performance of the exact likelihood function. The general goal of including context-conditioned prior probability estimates in the optimum discriminant function is to realistically constrain or guide the possible outcomes of spectral estimation component 140.

FIG. 5 is a diagram illustrating a codebook 500, such as a codebook combined from codebooks 210 and 230, but additionally including probability fields 510. Probability fields 510-1 through 510-N (collectively referred to as probability fields 510) may store probabilities related to the frequency with which the corresponding spectral envelopes occur in human speech. By analogy, in English language text, the letter 'e' occurs relatively frequently and the letter 'x' occurs relatively infrequently so that the a priori probability of encountering the letter 'e' in some future text is relatively higher than the a priori probability of encountering the letter 'x'. Similarly, certain speech spectral envelopes occur relatively more frequently in human speech than other speech spectral envelopes and may be assigned a relatively higher a priori probability in probability fields 510. In one implementation, codebook 500 may contain parameters that define the signal power spectral densities that can be produced by many different individuals. Due to speaker physiological variations, however, codebook 500 may be much larger than a codebook covering a single speaker.

Probability fields 510 may be customized to an individual speaker. As a simple example, probability fields 510 may be set to zero for those spectral envelopes that are not produced by a particular speaker. These corresponding spectral envelopes do not need to be tested as a potentially valid spectral hypothesis, thus saving computational resources. In alternate implementations, probability fields 510 may be set to include a weight between zero and one based on the speaker-dependent likelihood that the speaker will make a sound corresponding to the codebook entry. These probabilities can than be used to modify the discriminant function implemented by discriminant function calculation component 240.

Alternatively, probability fields 510 may be customized to a group of talkers, such as groups based on a native language of the talkers. For example, native French speakers may tend to more frequently produce spectra corresponding to nasalized sounds than speakers with a general American dialect. Thus, probability fields may be conditioned upon whether the speaker is a native French speaker or one with a general American dialect and the prior probability for a particular spectrum corresponding to a nasalized sound may be higher when conditioned upon the talker being a native French speaker than when the talker has a general American dialect.

Appropriate values for probability fields 510 may be estimated based on an earlier training session with a particular speaker 110 or may be estimated dynamically as speaker 110 interacts with system 100.

In addition to modifying the discriminant function based on a particular context that corresponds to a speaker, spectral estimation component 140 may make context-conditioned spectral parameter estimates based on spectral parameters estimated from previous signal segments. Previous signal segments can be useful in predicting succeeding segments. For example, because different spectral envelopes correspond to different vocal tract shapes, and because the shape of the vocal tract changes relatively slowly, the prior probability of seeing a spectral shape corresponding to the center of one vowel sound, given that we just saw a spectral shape corresponding to the center of a different vowel sound in the immediately preceding segment, is near zero. This type of context-conditioned prior probability can help ensure that the temporal sequence of speech spectral envelope estimates follows a more natural speech-like pattern rather than leaping around erratically over time.

Figure 6:
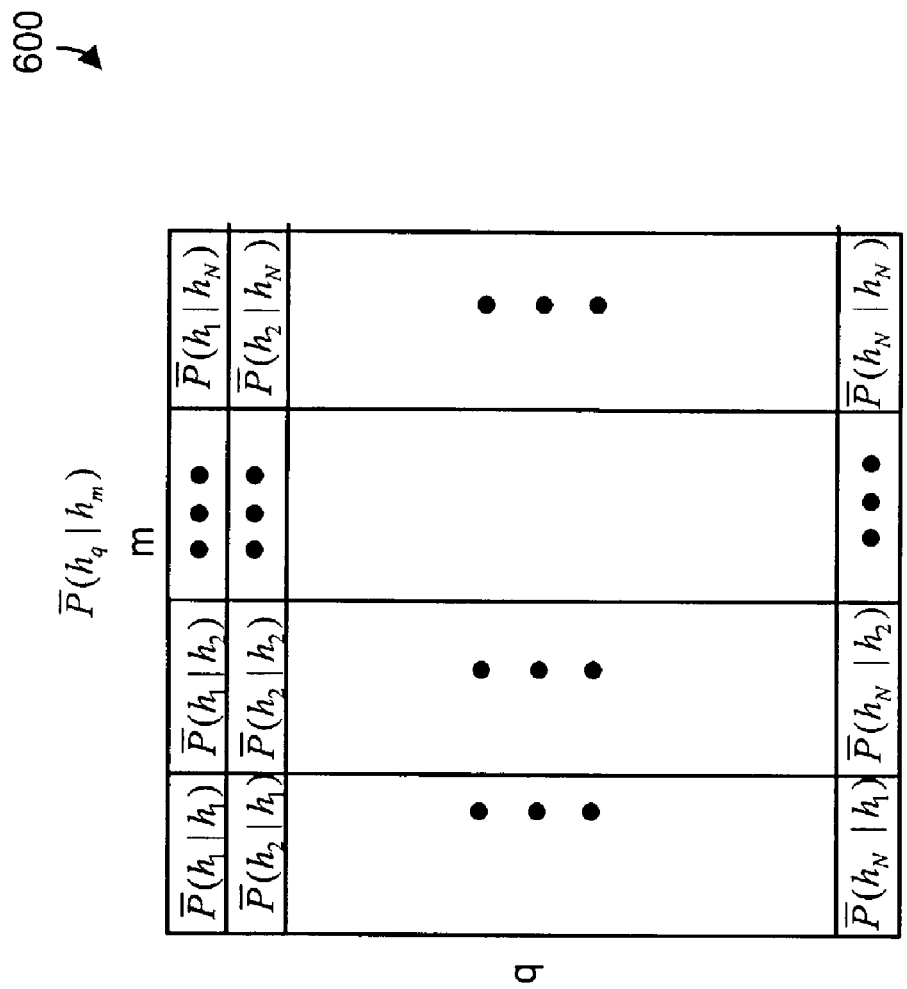
FIG. 6 is a diagram illustrating a table of prior probabilities estimated for previous pairs of spectral parameters.

FIG. 6 is a diagram illustrating a table 600 of prior probabilities estimated for pairs of spectral envelopes. In FIG. 6, the conditional prior probability $\overline{P}(h_q|h_m)$ represents the a priori probability of seeing the spectral envelope $h_q$ given that spectral envelope $h_m$ was present in the previous signal segment. These prior probabilities are illustrated in FIG. 6 in prior probability table 600 as the conditional prior probabilities $\overline{P}(h_q|h_m)$ stored at row q and column m in table 600. The conditional prior probabilities $\overline{P}(h_q|h_m)$ may be used for a particular speaker or for a population of speakers. In table 600, the conditional prior probabilities in any column m should sum to one. Thus, if the m-th spectral hypothesis was determined to apply to the previous segment of noisy speech, the prior probability values from the m-th column would be used in determining the spectral hypothesis that applies to the current speech segment.

The conditional prior probabilities in table 600 may be estimated in an earlier training session or they may be estimated dynamically/adaptively while the system is in use.

Figure 7:
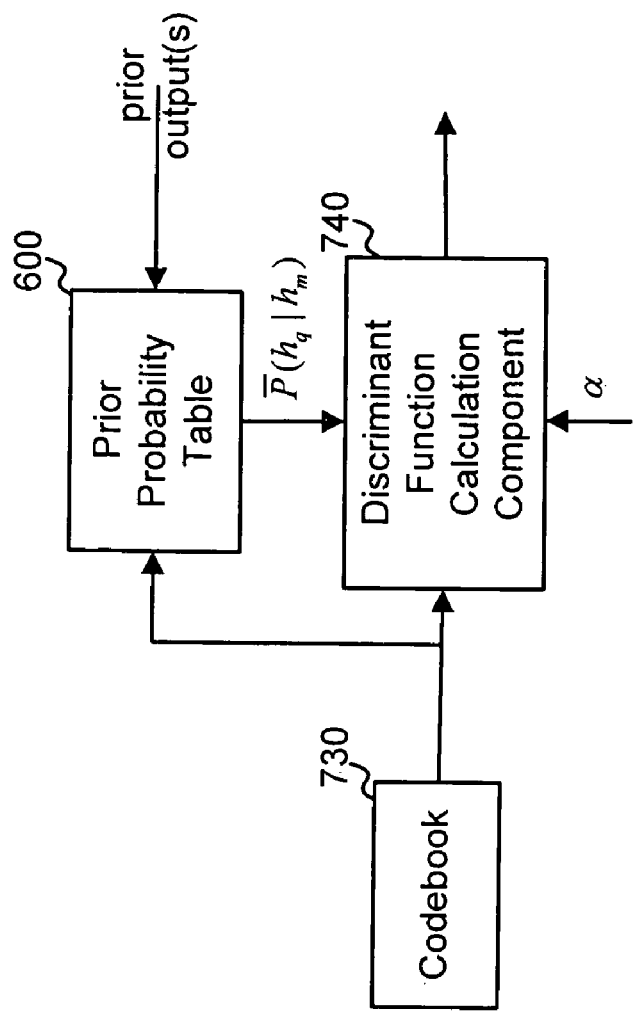
FIG. 7 is a block diagram illustrating exemplary operational components of an implementation of the spectral estimation component in which prior probabilities are taken into account.

FIG. 7 is a block diagram illustrating exemplary operational components of an implementation of spectral estimation component 140 in which the above mentioned context-conditioned prior probabilities are taken into account. FIG. 7 is similar to FIG. 2, except that in FIG. 7, prior probability table 600 is additionally included and discriminant function calculation component 240 is replaced with discriminant function calculation component 740, which receives prior probabilities $\overline{P}(h_q|h_m)$ from table 600. Additionally, a codebook 730 is shown, which may correspond to a combined speech and noise codebook having N entries. In operation, the current entry (i.e., q) from codebook 730 and the index corresponding to the prior output optimum spectral density function (i.e., m) from discriminant function calculation component 740 are used to index table 600. The corresponding prior probability $\overline{P}(h_q|h_m)$ is then used by discriminant function calculation component 740 in calculating the likelihood of the current hypothesized spectral parameters. In particular, the corresponding prior probability $\overline{P}(h_q|h_m)$ corresponds to the a priori probabilities, $\overline{P}(h_q)$, in equations (9), (12) and (13). Accordingly, calculation component 740 may directly use the prior probabilities $\overline{P}(h_q|h_m)$ to evaluate the optimum spectral hypothesis.

Context-Conditioned Prior Probabilities with Separate Speech and Noise Spectral Codebooks In some situations, the noise process may be assumed to be stationary and can thus be characterized by a single measured noise power spectral density function $\mu(\theta)$. In this situation, noise codebook 210 may contain only a single entry. While a stationary noise model may be representative of some simple acoustically noisy environments, many important environments are characterized by a noise field whose spectral character changes over time. For example, the noise in an automobile (or some other ground vehicle) may change in both its spectral shape and its level as the automobile accelerates or moves over different terrain. In a restaurant or bar, there may be an unpredictable crash as dishes are accidentally broken. In a helicopter, the whine of the gear box and the blade-vortex interaction may change with the operating conditions. Accordingly, in situations such as these, noise codebook 210 may contain multiple entries to take into account non-stationary noise processes.

Figure 8:
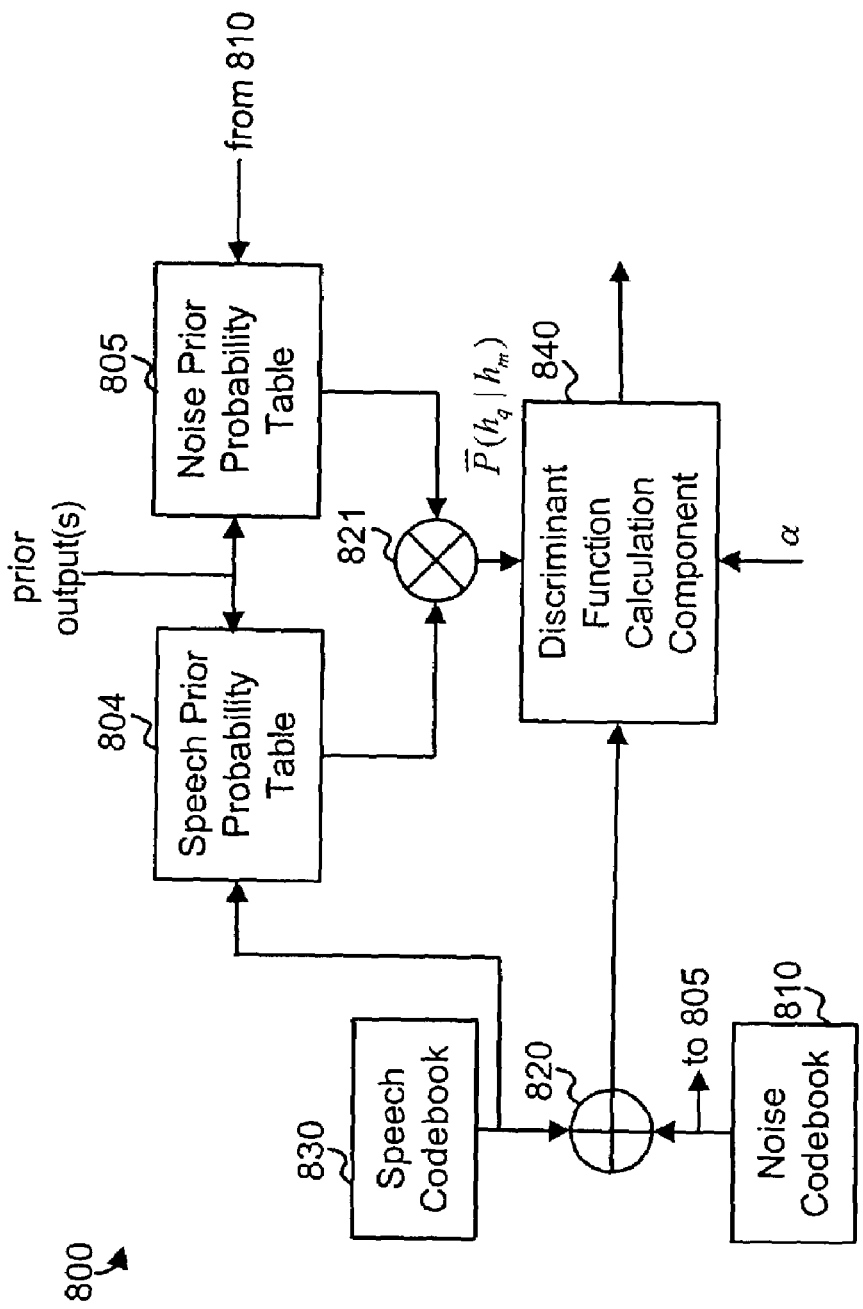
FIG. 8 is a block diagram illustrating operational components of an implementation of a spectral estimation component including a noise spectral codebook.

FIG. 8 is a block diagram illustrating operational components of an implementation of a spectral estimation component 800 similar to spectral estimation component 130 that additionally includes a noise spectral codebook with context-conditioned noise prior probabilities. The system includes a speech codebook 830 and a combiner 820 similar to speech codebook 230 and combiner 220. The system also includes noise codebook 810, similar to noise codebook 210. Thus, noise codebook 210 may be pre-constructed by sampling various noise signals in an ideal environment or by dynamically sampling noise samples during system operation.

Figure 9:
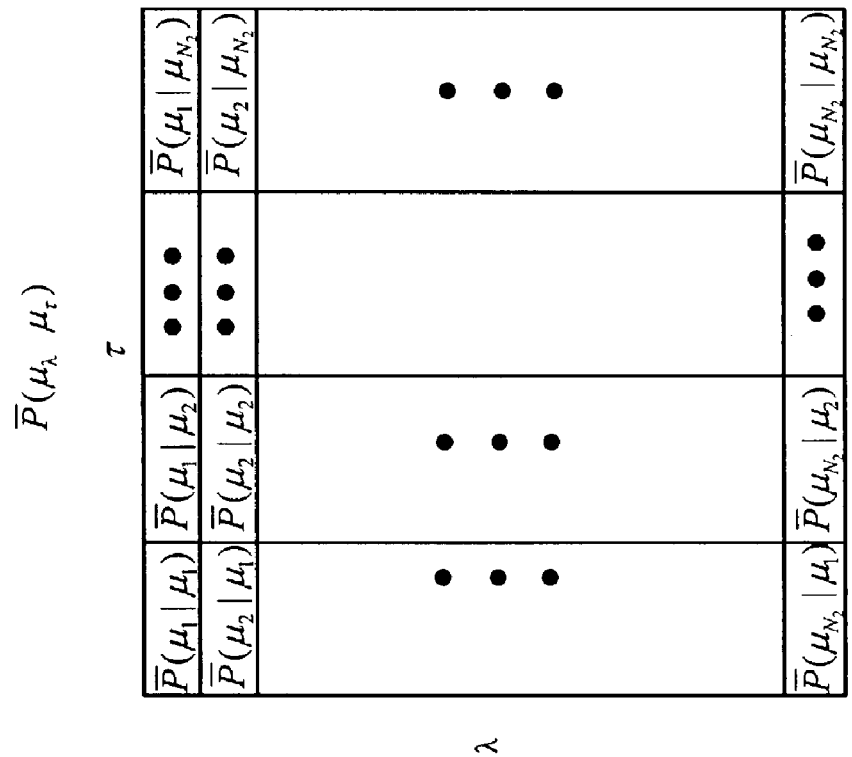
FIG. 9 is a diagram illustrating an exemplary implementation of the noise prior probability table shown in FIG. 8.

Prior probability table 600 is separated into a codebook of speech prior probabilities 804 and a codebook of noise prior probabilities 805. Noise prior probabilities table 805 may include prior probabilities $\overline{P}(\mu_l|\mu_r)$ that represent the prior probability of seeing noise spectral envelope $\mu_l$ given that noise spectral envelope $\mu_r$ was present in the previous segment. Speech prior probabilities table 804 may include prior probabilities $\overline{P}(g_k|g_s)$ that represent the prior probability of seeing speech spectral envelope $g_k$ given that speech spectral envelope $g_s$ was present in the previous segment. FIG. 9 is a diagram illustrating an exemplary implementation of noise prior probabilities table 805 in additional detail. The conditional noise prior probabilities in table 805 may be estimated in an earlier training session or they may be estimated dynamically/adaptively while the system is in use. Speech prior probability table 804 may be implemented in a similar manner.

Additionally, in some implementations, noise codebook 810 may contain noise spectra corresponding to many different environments (e.g., car, airplane, office, helicopter, cocktail party, etc.). Noise prior probabilities 805 may be conditioned upon the environment. For example, different makes and model of automobiles may have different noise environments (e.g., due to different aerodynamic design of side-view mirrors, luggage racks, engine size, etc.) and the noise environment may vary with the speed or other operating characteristics of the automobile as well. The prior probabilities for the various noise spectra could thus be conditioned upon factors such as the make and model of the automobile, the speed of the automobile, and whether any windows are open.

The speech and noise signals are assumed to be statistically independent of each other. In this situation, the total prior probability ($\overline{P}(h_q|h_m)$) corresponds to the product, performed by multiplier 821, of the context-conditioned speech prior probability $\overline{P}(g_k|g_s)$ from table 804 and the context conditioned noise prior probability $\overline{P}(\mu_l|\mu_r)$ from table 805. Equivalently, these probabilities may be described in terms of the log probabilities, in which case "multiplier" 821 may perform the operation $\ln \overline{P}(h_q|h_m) = \ln \overline{P}(g_k|g_s) + \ln \overline{P}(\mu_l|\mu_r)$.

$\overline{P}(h_q|h_m)$ represents the final prior probability and is used by discriminant function calculation component 840 in calculating the likelihood of the current hypothesized spectral parameters. Discriminant calculation component 840 operates in a manner similar to discriminant function calculation component 740.

Vocoder

Figure 10:
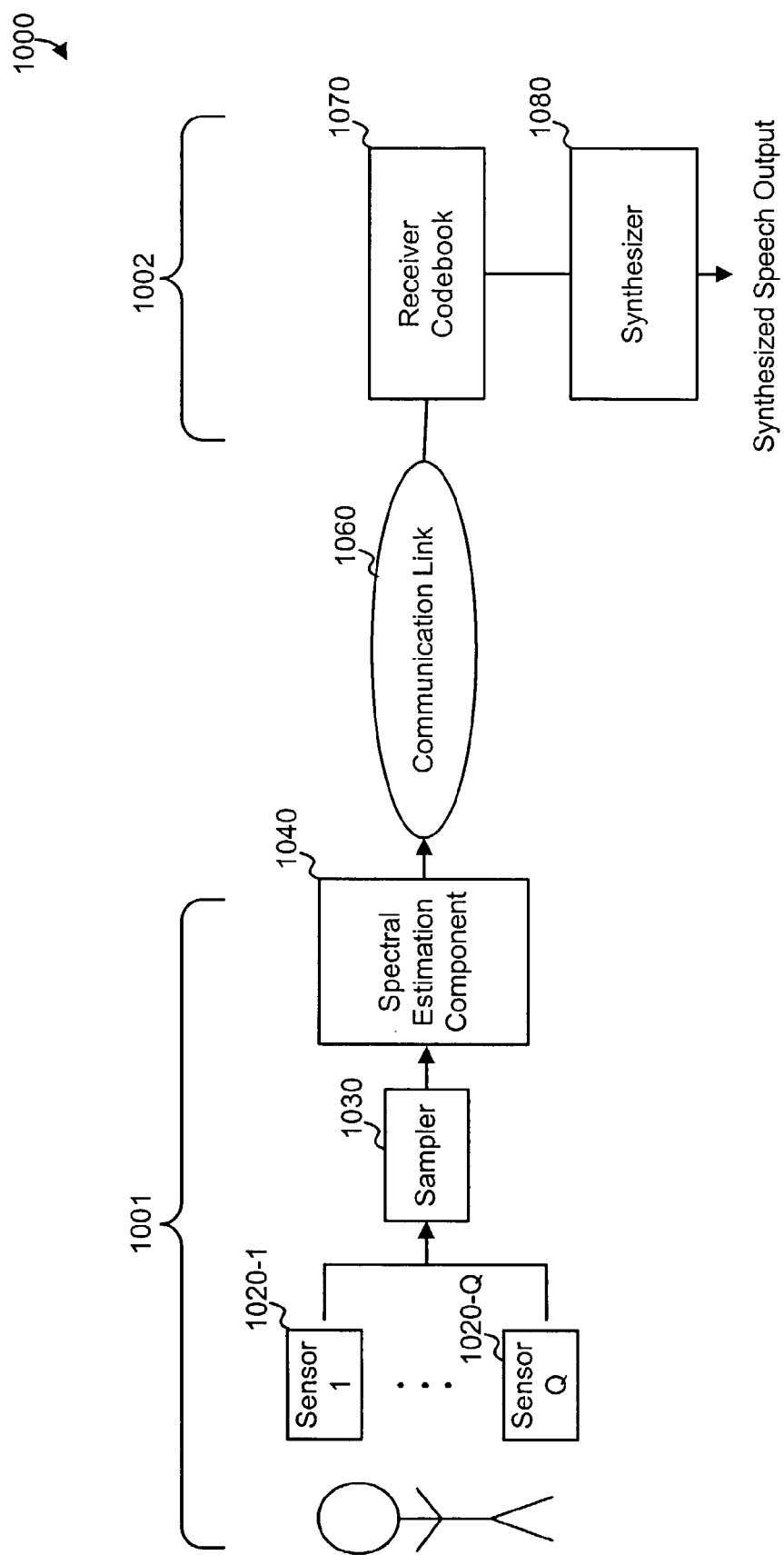
FIG. 10 is a block diagram illustrating a vocoder.

The speech analysis performed by system 100 may be used in a number of different speech applications. Examples of such applications include vocoder-based applications, speech recognition applications, speaker recognition applications, keyword (or phrase) spotting applications, speech enhancement applications, and language recognition applications. FIG. 10 is a block diagram illustrating one of these applications, a vocoder, in additional detail.

Vocoder 1000 includes a transmitting side 1001 and a receiving side 1002. Transmitting side 1001 may include a system similar to that shown in FIG. 1. In particular, sensors 1020-1 through 1020-Q may receive audio signals from a user. The audio signals may be sampled by sampler 1030, and spectral parameters may be estimated for the sampled signals via spectral estimation component 1040. Spectral estimation component 1040 may be implemented as described above with reference to FIG. 2, 7, or 8. The output of spectral estimation component 1040 may be, for each segment of speech, an index value into the speech codebook. Over time, a series of index values will be output by spectral estimation component 1040.

The index values may be transmitted over communication link 1060. Communication link 1060 may include, for example, a wired network, a wireless network, a radio link, etc. Because only the indexes into the codebook need to be transmitted over communication link 1060, the bandwidth required for communication link 1060 is relatively small. Accordingly, communication link 1060 can be any link that is capable of transmitting the series of speech codebook indexes.

At receiving side 1002, the received indexes are used to index a receiving codebook 1070. Codebook 1070 may be identical to the codebook used by spectral estimation component 1040. The spectral parameters output from receiving codebook 1070 are then converted back into a speech signal by synthesizer 1080.

In some vocoder implementations, parameters other than the index values may be transmitted over link 1060. These other parameters may relate to an 'excitation' signal and may include an indication of whether the current analysis frame represents voiced or unvoiced speech; in the case of voiced speech (that is, speech in which glottal pulses are the source of the 'excitation' signal) a parameter may indicate the 'pitch period' (that is, the spacing between glottal pulses, etc.).

CONCLUSION

The speech analysis system described above uses a single step paradigm of spectral hypothesis testing to estimate speech spectral parameters. In this single step paradigm, codebook entries correspond to spectral hypotheses. A discriminant function is used to evaluate the likelihood that a particular spectral hypothesis corresponds to a measured speech segment. The PCG process may be used to evaluate the discriminant function in a computationally efficient manner.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code or hardware logic. It should be understood that a person of ordinary skill in the art would be able to design software and control hardware to implement the aspects of the present invention based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A speech analysis device comprising:
   a plurality of sensors for receiving a signal segment;
   a codebook configured to store parameters corresponding to a plurality of hypothesized speech power spectral density functions; and
   a discriminant function calculation component configured to evaluate a likelihood of at least one of the hypothesized speech power spectral density functions corresponding to the signal segment based on application of a discriminant function evaluated using a preconditioned conjugate gradient (PCG) process configured for block Toeplitz type matrices with a block size corresponding to the number of sensors.

2. The device of claim 1, further comprising:
   a microphone configured to sense an audio signal that includes the signal segment.

3. The device of claim 2, further comprising:
   a non-acoustic sensor configured to sense vibration information related to a talker of the signal segment; and
   a sampler configured to sample outputs of the microphone and the non-acoustic sensor and output the signal segment as a combination of the sampled outputs of the microphone and the non-acoustic sensor.

4. The device of claim 1, further comprising:
   a prior probability table configured to store prior conditional probabilities of first speech spectral parameters following second speech spectral parameters.

5. The device of claim 4, wherein the discriminant function calculation component evaluates the likelihood of the hypothesized speech power spectral density functions corresponding to the signal segment based additionally on the prior conditional probabilities.

6. The device of claim 1, further comprising:
   a noise codebook configured to store noise parameters corresponding to a plurality of hypothesized noise power spectral density functions; and
   a combiner configured to combine at least one of the noise power spectral density functions with at least one of the speech power spectral density functions to obtain a spectral hypothesis.

7. A method for determining spectral parameters corresponding to a segment of signal, the method comprising:
   receiving the segment of the signal from a plurality of sensors;
   generating a hypothesized noise power spectral density function;
   generating a hypothesized speech power spectral density function;
   combining the hypothesized power spectral density functions to obtain a spectral hypothesis;
   evaluating a likelihood that the spectral hypothesis corresponds to the segment of the signal based on application of a discriminant function evaluated using a preconditioned conjugate gradient (PCG) process configured for block Toeplitz type matrices with a block size corresponding to the number of sensors.

8. The method of claim 7, wherein generating the hypothesized noise power spectral density function includes:
   retrieving parameters corresponding to the hypothesized noise power spectral density function from a pre-created noise codebook.

9. The method of claim 7, wherein generating the hypothesized speech power spectral density function includes:
   retrieving parameters corresponding to the hypothesized speech power spectral density function from a pre-created speech codebook.

10. The method of claim 7, wherein the evaluating a likelihood that the spectral hypothesis corresponds to the signal is performed for a plurality of different spectral hypotheses, the method further comprising:
    selecting one of the plurality of spectral hypotheses corresponding to an optimal special hypothesis.

11. The method of claim 10, further comprising:
    outputting one or more index values identifying the selected one of the plurality of spectral hypotheses.

12. The method of claim 7, further comprising:
    generating a first conditional prior probability reflecting a likelihood of the spectral hypothesis occurring in a next segment of the signal given an immediately preceding segment of the signal, wherein evaluating the likelihood that the spectral hypothesis corresponds to the signal is additionally based on the first conditional prior probability.

13. The method of claim 12, wherein the first conditional prior probability is speaker dependent.

14. The method of claim 12, wherein the first conditional prior probability is based on:
    a speech conditional prior probability that reflects a likelihood of the hypothesized speech power spectral density function occurring in a next segment of the signal given the speech power spectral density function of the immediately preceding segment; and
    a noise conditional prior probability that reflects a likelihood of the hypothesized noise power spectral density function occurring in a next segment of the signal given the noise power spectral density function of the immediately preceding segment.

15. The method of claim 7, further comprising:
    measuring the signal using a microphone, and
    sampling the measured signal from the microphone to obtain a sampled microphone signal.

16. The method of claim 15, further comprising:
    measuring vibration information relating to a talker of the segment of the signal using a non-acoustic sensor,
    sampling the measured segment of the vibration information from the non-acoustic sensor to obtain a sampled non-acoustic sensor signal, and
    combining the sampled microphone signal and the sampled non-acoustic sensor signal.

17. The method of claim 7, wherein the discriminant function is based on either the exact likelihood function or the exact log likelihood function.

18. A speech analysis system comprising:
a plurality of sensors for receiving signals;
a sampler configured to sample and quantize the signals to form a sampled signal; and
a spectral estimation component configured to estimate spectral parameters corresponding to speech of a talker, the spectral estimation component including:
a codebook configured to store parameters corresponding to a plurality of hypothesized spectral envelopes, and
a discriminant function calculation component configured to evaluate a likelihood of the hypothesized spectral envelopes corresponding to the speech of the talker based on application of a discriminant function evaluated using a preconditioned conjugate gradient (PCG) process configured for block Toeplitz type matrices with a block size corresponding to the number of sensors.

19. The speech analysis system of claim 18, wherein the plurality of sensors includes a microphone.

20. The speech analysis system of claim 18, wherein the a plurality of sensors includes a microphone and a non-acoustic sensor.

21. The speech analysis system of claim 18, wherein the spectral estimation component further comprises:
a prior probability table configured to store prior conditional probabilities of first spectral parameters following second spectral parameters.

22. The speech analysis system of claim 21, wherein the discriminant function calculation component evaluates the likelihood of the hypothesized spectral envelopes corresponding to the speech of the user based additionally on the prior conditional probabilities.

23. The speech analysis system of claim 18, wherein the codebook further comprises:
a noise codebook configured to store noise spectral parameters corresponding to a plurality of hypothesized noise spectral envelopes,
a speech codebook configured to store speech spectral parameters corresponding to a plurality of hypothesized speech spectral envelopes, and
wherein the spectral estimation component further includes a combiner configured to combine the noise spectral parameters with the speech spectral parameters to obtain parameters corresponding to the hypothesized spectral envelopes.

24. A vocoder device comprising:
a plurality of sensors for receiving signal segments;
a transmit codebook configured to store speech spectral parameters corresponding to a plurality of hypothesized speech spectral envelopes;
a discriminant function calculation component configured to evaluate a likelihood of the hypothesized speech spectral envelopes corresponding to the signal segments based on application of a likelihood function evaluated using a preconditioned conjugate gradient (PCG) process configured for block Toeplitz type matrices with a block size corresponding to the number of sensors and to output the most likely hypothesized spectral envelopes of the plurality of hypothesized speech spectral envelopes; and
a transmitter configured to transmit index values corresponding to indexes of the most likely hypothesized speech spectral envelopes in the transmit codebook.

25. The vocoder device of claim 24, further comprising:
a receiver configured to receive the index values;
a receive codebook configured to store the speech spectral parameters corresponding to the plurality of hypothesized speech spectral envelopes; and
a synthesizer configured to synthesize human speech signals based on the speech spectral parameters indexed by the received index values.

26. The vocoder device of claim 24, wherein the index values are transmitted via a low bandwidth communication link.

27. A speech analysis device comprising:
a plurality of sensors for receiving a signal segment;
a speech codebook configured to store speech spectral parameters corresponding to a plurality of hypothesized speech spectral envelopes;
a noise codebook configured to store noise spectral parameters corresponding to a plurality of hypothesized noise spectral envelopes;
a combiner configured to combine the noise spectral parameters with the speech spectral parameters to obtain hypothesized power spectral density functions; and
a discriminant function calculation component configured to evaluate a likelihood of the hypothesized power spectral density functions corresponding to the signal segment based on application of a likelihood function evaluated using a preconditioned conjugate gradient (PCG) process configured for block Toeplitz type matrices with a block size corresponding to the number of sensors.

28. The speech analysis device of claim 27, further comprising:
a prior probability table configured to store prior conditional probabilities of first speech spectral envelopes following second speech spectral envelopes, wherein the discriminant function calculation component evaluates the likelihood of the hypothesized power spectral density functions corresponding to the signal segment based additionally on the prior conditional probabilities.

29. The speech analysis device of claim 28, further comprising:
a second prior probability table configured to store second prior conditional probabilities of first noise spectral envelopes following second noise spectral envelopes, wherein the discriminant function calculation component evaluates the likelihood of the hypothesized power spectral density functions corresponding to the signal segment based additionally on the second prior conditional probabilities.

30. A device for determining spectral parameters corresponding to a segment of signal, the device comprising:
a plurality of sensors for receiving the segment of the signal;
means for generating a hypothesized noise power spectral density function;
means for generating a hypothesized speech power spectral density function;
means for combining the hypothesized power spectral density functions to obtain a spectral hypothesis; and
means for evaluating a likelihood that the spectral hypothesis corresponds to the segment of the signal based on application of the exact likelihood function evaluated using a preconditioned conjugate gradient (PCG) process configured for block Toeplitz type matrices with a block size corresponding to the number of sensors.

31. The device of claim 30, further comprising:
means for storing prior conditional probabilities conditioned upon at least one of a particular talker, particular group of talkers, or a particular noise environment, wherein the means for evaluating evaluates the likelihood of the hypothesized power spectral density functions corresponding to the signal segment based additionally on the prior conditional probabilities.

32. An analysis device comprising:
a plurality of sensors for receiving a signal segment;
a codebook configured to store parameters corresponding to a plurality of hypothesized power spectral density functions;
a discriminant function calculation component configured to evaluate a likelihood of the hypothesized power spectral density function corresponding to the signal segment based on application of a discriminant function evaluated using a preconditioned conjugate gradient (PCG) process configured for block Toeplitz type matrices with a block size corresponding to the number of sensors; and
a prior probability table configured to store prior conditional probabilities relating to the hypothesized power spectral density functions, wherein the discriminant function calculation component evaluates the likelihood of the hypothesized power spectral density functions corresponding to the signal segment based additionally on the prior conditional probabilities.

33. The device of claim 32, wherein the codebook further includes:
a first codebook configured to store parameters corresponding to a plurality of hypothesized speech power spectral density functions; and
a second codebook configured to store parameters corresponding to a plurality of hypothesized noise power spectral density functions.

34. The device of claim 32, wherein the prior probability table stores prior conditional probabilities of first noise spectral envelopes following second noise spectral envelopes, and wherein the discriminant function calculation component evaluates the likelihood of the hypothesized power spectral density functions corresponding to the signal segment based on the conditional probabilities of the first noise spectral envelopes following the second noise spectral envelopes.

35. The device of claim 32, wherein the prior probability table stores prior conditional probabilities of first speech spectral envelopes following second speech spectral envelopes, and wherein the discriminate function calculation component evaluates the likelihood of the hypothesized power spectral density functions corresponding to the sampled signal segment based on the conditional probabilities of the first speech spectral envelopes following the second speech spectral envelopes.

36. The device of claim 32, wherein the prior probability table stores probabilities conditioned upon a particular talker.

37. The device of claim 32, wherein the prior probability table stores probabilities conditioned upon a particular group of talkers.

38. The device of claim 32, wherein the prior probability table stores probabilities conditioned upon a particular noise environment.

39. A speech analysis device comprising:
a plurality of sensors for receiving a signal segment;
a codebook configured to store parameters corresponding to a plurality of hypothesized power spectral density functions; and
a discriminant function calculation component configured to evaluate a likelihood of the hypothesized power spectral density function corresponding to the signal segment based on application of a discriminant function evaluated using a preconditioned conjugate gradient (PCG) process configured for block Toeplitz type matrices with a block size corresponding to the number of sensors.

40. The device of claim 39, further comprising:
a microphone configured to sense an audio signal that includes the signal segment.

41. The device of claim 39, further comprising:
a prior probability table configured to stores prior conditional probabilities of first spectral parameters following second spectral parameters.

42. The device of claim 41, wherein the discriminant function calculation component evaluates the likelihood of the hypothesized power spectral density functions corresponding to the signal segment based additionally on the prior conditional probabilities.

* * * * *